(12) United States Patent
Strack et al.

(10) Patent No.: US 6,700,391 B2
(45) Date of Patent: Mar. 2, 2004

(54) CAPACITIVE DISPLACEMENT SENSOR

(75) Inventors: Peter Strack, Chanteheux (FR); Christian Steiner, Blainville sur l'Eau (FR)

(73) Assignee: Carl Mahr Holding GmbH, Göttingen (DE)

( * ) Notice: Subject to any disclaimer, the term of this patent is extended or adjusted under 35 U.S.C. 154(b) by 0 days.

(21) Appl. No.: 10/088,641

(22) PCT Filed: Jul. 18, 2001

(86) PCT No.: PCT/DE01/02625
§ 371 (c)(1),
(2), (4) Date: Mar. 20, 2002

(87) PCT Pub. No.: WO02/08697
PCT Pub. Date: Jan. 31, 2002

(65) Prior Publication Data
US 2002/0135384 A1 Sep. 26, 2002

(30) Foreign Application Priority Data
Jul. 20, 2000 (DE) .......................... 100 35 192

(51) Int. Cl.[7] .............................................. G01R 27/26
(52) U.S. Cl. ..................................................... 324/662
(58) Field of Search ............................... 324/660, 661, 324/658, 662, 686, 679, 678; 340/870, 37

(56) References Cited

U.S. PATENT DOCUMENTS 4,420,754 A   12/1983  Andermo ............... 324/660
4,437,055 A *  3/1984  Meyer .................. 324/725

FOREIGN PATENT DOCUMENTS

DE    197 53 682    11/1998
EP    0 715 153     6/1996
WO    90/02923     3/1990

* cited by examiner

Primary Examiner—N. Le
Assistant Examiner—James Kerveros
(74) Attorney, Agent, or Firm—Venable LLP; Stuart I. Smith

(57) ABSTRACT

A distance measuring system (1) is provided with a capacitive sensor (7a, 7b), designed in the form of a differential capacitor (18), for which the partial capacitors (C1, C2 have capacitances that depend on the position to be determined. The system also includes a processing device (5) for determining the desired distance that contains, for example, a sigma/delta demodulator. The partial capacitors (C1, C2) are triggered periodically with binary signals, wherein the trigger signals from the one partial capacitor (C1) are transmitted with a phase offset to the signals from the other partial capacitor (C2). The processing device (5) determines which trigger signals must be used for the evaluation. Within time windows that are synchronized with the edges of the trigger signals, a switch unit (22) allows the associated receiving signals to pass through to the processing unit (5) and blanks out all other signals. The distance measuring system (1) makes it possible to have a low number of interpolation errors with high resolution and long interpolation periods. The distance measuring system (1) can be expanded by adding two essentially independent, parallel-operating relative measuring systems to form an absolute distance measuring system, which determines the absolute position solely from the current measuring values. A nearly optional enlargement of the measuring range is possible by adding further relative measuring systems.

38 Claims, 8 Drawing Sheets

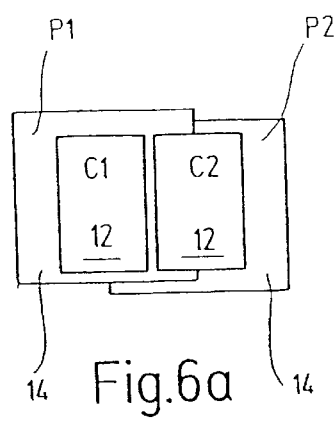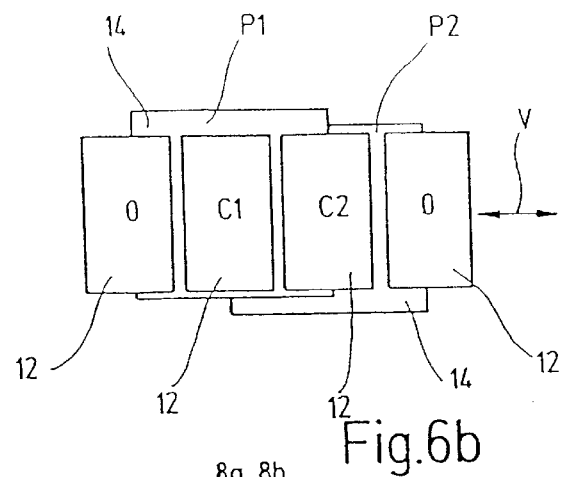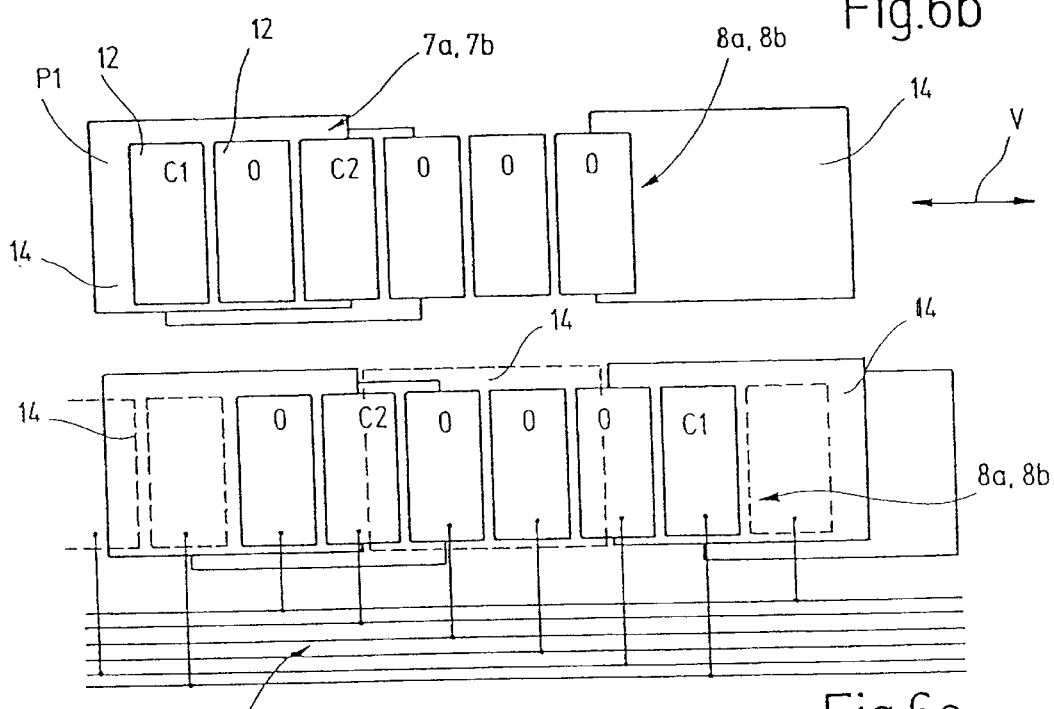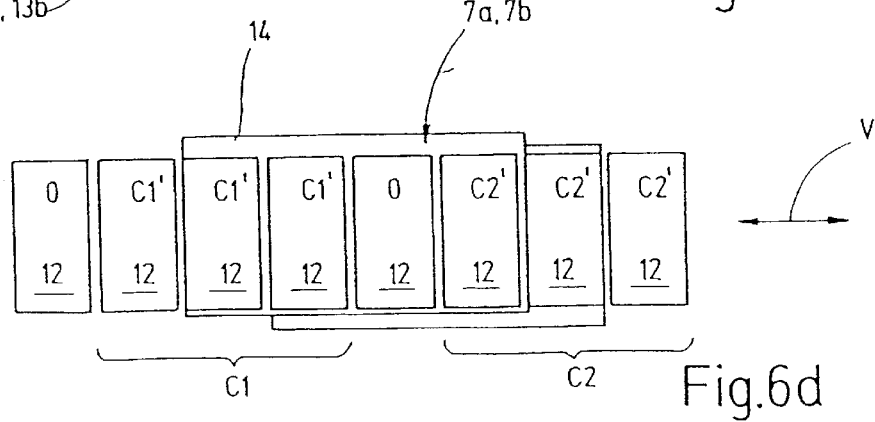

CAPACITIVE DISPLACEMENT SENSOR

FIELD OF THE INVENTION

The invention relates to a capacitive distance measuring system and in particular a capacitive length measuring system for electronically detecting and displaying a position or a displacement distance.

BACKGROUND OF THE INVENTION

A distance measuring system is known from EP 0 442 898 B1, which system uses a capacitive sensor designed as differential capacitor, as well as a sigma/delta converter, consisting of an integrator and a comparator. The differential capacitor comprises two side-by-side arranged transmitting electrodes and a joint receiving electrode, which is arranged a short distance from the transmitting electrodes on a scale, so as to be displaceable relative to these transmitting electrodes. Depending on the displacement position, the receiving electrode overlays the individual transmitting electrodes differently, which leads to changes in the capacitances for the partial capacitors of the differential capacitor. These changes represent a measure for the displacement distance to be measured.

In order to determine the partial capacitance ratio, the individual transmitting electrodes of the differential capacitor are fed during each cycle with charge packets of a predetermined size but different polarity. A positive charge packet is transmitted to the one transmitting electrode, if the total charge amount transmitted via the receiving electrode to the integrator and integrated therein is negative. A negative charge packet is transmitted to the other transmitting electrode if the total charge is positive. The number of respectively transmitted packets is detected with associated interpolation counters. The ratio of these counters relative to each other reflects the sought after ratio of the partial capacitances.

Several transmitting electrodes are arranged in a row for the measuring of longer lengths. If the measuring range that is fixed by one pair of transmitting electrodes is abandoned during the displacement, then a change to the next pair occurs. The number and direction of the change operations are also counted and are used jointly with the interpolation counters for determining the distance traveled.

The known distance measuring system has proven itself in practical operations. However, interference signals resulting from the triggering of transmitting electrodes, the display and other sources of interference are also integrated and lead to non-linearity, reflected in the measuring accuracy. In addition, a supply source must be provided that transmits charge packets with a specific polarity at the selected moments to the corresponding partial capacitor.

SUMMARY OF THE INVENTION

Starting with this premise, it is the object of the invention to create a suitable distance measuring system, in particular for battery-operated hand-held devices, which ensures the highest possible measuring accuracy with the highest possible resolution. In addition, the distance measuring system should operate with a simple energy supply.

The distance measuring system is provided with one or several capacitive sensors, which are designed as differential capacitors. The capacitive distance measuring can be realized with power savings compared to prior methods. The capacitances used are in the pF (pico-farad) range, as a result of which the transmitted charge amounts and the resulting currents are very low. Each sensor comprises at least 2, for example 16, transmitting electrodes that are preferably arranged in a row with a constant distance there between. The sensor further comprises one or preferably several, for example 64, counter electrodes that are also arranged in a row. The electrodes are arranged on a measurer, such as a ruler or measuring tape, opposite the respective transmitting electrodes and at a short, equal distance to these. The measurer is positioned such that it can be adjusted and in particular can be displaced relative to the transmitting electrodes. Thus, at least two partial capacitors are formed in this way, wherein the capacitance of at least one of the partial capacitors changes proportional to the distance distance.

A triggering device is used to feed a binary signal to selected one or groups of transmitting electrodes for generating individual measuring signals at predetermined times. The signals for triggering the two partial capacitors are fixedly offset in phase relative to each other, so that the resulting measuring signals do not overlap in time if possible. If voltage pulses are used for the triggering, the measuring signals essentially are the transmitted current surges that form a charge amount (a charge packet). If current signals or charge packets function as trigger signals, however, voltages are measured.

A switch unit is advantageously provided, containing switches that are closed for a predetermined interval to define time windows. The time windows include selected edges of the trigger signals positioned therein. Inside the time windows, the associated measuring signals are allowed to pass through to a processing device, which evaluates these signals and uses the results to determine the partial capacitances of the differential capacitor. The processing device determines the distance to be measured from the partial capacitances.

The energy supply can have a very simple design. The trigger signals transmitted to the one partial capacitor can have the same curve shape as the trigger signals for the other partial capacitor. They can even have the same polarity and assume the same values, so that positive or negative rectangular signals, for example, are particularly suitable for use as trigger signals. Simple battery cells are sufficient for the energy supply.

It is advantageous if the phase offset and the time window are fixed such that only one selected signal edge can be observed inside one time window. With a 90° phase offset, an equidistant spacing of one fourth of the clock cycle is obtained between the edges of the trigger signals for the two partial capacitors. The time window is smaller than the pulse duration of a trigger signal. It is advantageous if the time window essentially includes only the respective edge change, meaning it represents only a fraction of the total signal period. Interference signals consequently do not influence the evaluation during the complete signal duration, but only briefly during the edge change where the interference distance is high. As a result, the linearity of the measuring system is improved and a high measuring accuracy is possible.

The processing device can contain a capacitive sigma/delta converter that essentially consists of an integrator with a downstream-connected comparator. The integrator integrates the charge received from the differential capacitor. The comparator provides an output signal that corresponds to the mathematical sign for this charge and determines the signal edge to be evaluated next. If both partial capacitors are triggered with positive rectangular signals, for example, either the rising edge of the trigger signal for the one partial capacitor or the decreasing edge, offset by half a cycle, of the trigger signal to the other partial capacitor is selected in dependence on the comparator output. With trigger signals having different polarity, either the front or the rear edges of the trigger signals are always evaluated.

The time window should be sufficiently large, so that the received charge packets are almost completely integrated in an integration capacitor of the integrator, taking into consideration the internal resistance of the source supplying the integration capacitor. The time window preferably is larger than the sum of the values for the trigger signal rise time and ten times the time constant $\tau=R_iC$, where $R_i$ characterizes the internal resistance of the voltage source used and C the maximum possible measuring capacitance. On the other hand, the time window should be as small as possible, meaning it should essentially only detect the signal edges and should be synchronized as accurately as possible with these edges, to limit the influence of non-linearity and interference signals as much as possible.

The switch unit according to one embodiment of the invention also makes it possible to create defined voltage conditions at the partial capacitors of a differential capacitor. The partial capacitors are in principle polarized relative to each other before a trigger signal is transmitted, without this changing the integrated total charge. The required measuring system linearity for a high measuring accuracy is ensured in this way.

The measuring system operation is synchronous, meaning the transmitting signals and the measuring signals are controlled by the same clock generator. As a result, interference signals are for the most part suppressed. The influence of low-frequency interference caused by the activation of the display unit, for example a liquid-crystal display (LCD), or by interference signals induced on the scale can be reduced further if the transmitting and measuring signals are inverted periodically after a number of clock cycles, preferably after each clock cycle. This can be realized through a periodic switch during the evaluation from the one edge of the measuring signals to the other edge.

The partition of the counter electrodes is proportional to that of the transmitting electrode rows. The width of the counter electrodes, measured in displacement direction, advantageously corresponds to a whole-number multiple of the width of the transmitting electrodes. This permits large areas of overlay with correspondingly large partial or measuring capacitances, a simple evaluation and long rows of counter electrodes with correspondingly large measuring ranges. In addition, each second counter electrode can be connected to ground because several transmitting electrode pairs arranged side by side can be assigned to an active counter electrode. As a result, even larger scale increments, meaning interpolation periods, and thus even larger absolute measuring distances can be achieved. However, it is also possible to provide only a few counter electrodes and several transmitting electrodes.

The signals transmitted to the counter electrodes are tapped via friction or non-friction contacts, for example via a receiving electrode with capacitive coupling to the counter electrode. The receiving electrode can be arranged together with the transmitting electrode row on a joint sensor head, for example parallel to it. To avoid cross talk, it is advantageous if this electrode is insulated against the transmitting electrodes, for example via grounded screen. Connecting lines need only extend to the sensor head and movable contacts can be omitted.

The partial capacitances are determined through interpolation. For this, the processing unit has a counter unit with two counters, which can each have a depth of 8 to 16 bits, preferably 8, 10 or 12 bits, depending on the desired resolution. One or several pulses are sent to each partial capacitor and the resulting charges are integrated. If a measuring signal is evaluated in one of the partial capacitors, the associated counter is incremented. The counter that first reaches its maximum value is used as denominator for computing the interpolation value. The other counter determines the interpolation value.

The counters are furthermore used to determine the pair of transmitting electrodes, which must be triggered and is sufficiently overlaid by the counter electrode. Few interpolation errors occur if the degree of overlay is always within a specified range, for example between 1:2 and 2:1. It is possible to detect whether the decree of overlay is out of this range in that one of the counters is incremented several times successively.

The transmitting electrodes can be combined into groups of several, for example 6, electrodes that offer a corresponding number of triggering options. Within the ranges fixed by the groups, the suitable electrode pair is triggered and the counter settings determined. Stringing together transmitting electrodes can increase the scale increments.

The distance measuring system of one particularly advantageous embodiment of the invention is designed as absolute distance measuring system. That is a system which supplies at any point in time the desired absolute position using only the currently detected values. A constant reading for control during the adjustment is not necessary as well as a readjustment of zero state following each start-up is not required. The active period can be reduced considerably and the measuring system can operate with low cycle rates, thus making the design extremely power saving. As a result, it is particularly suitable for battery-operated measuring devices. In addition, the susceptibility to errors can be reduced further because the measuring system does not lose the zero point due to an excessively high traversing speed or due to contamination.

The absolute measuring system according to the invention is provided with at least two capacitive sensors, designed as differential capacitors, which form two measuring systems with different partitions. In both measuring systems, the ratios of the partial capacitances of the respective differential capacitor, relative to each other, are determined. The absolute position can be determined from that.

A single receiving electrode only is used for one advantageous, space-saving arrangement. This receiving electrode is arranged between the rows of transmitting electrodes and parallel to these in the absolute distance measuring system. The counter electrodes are connected element-by-element to form a single row. Alternating in time, the transmitting electrode rows can also function either as a transmitter or as a receiver for the other transmitting electrode row. This kind of arrangement allows for the largest amount of surface area for the capacitor plates on a given surface of the sensor head and thus a good capacitive coupling.

A separate processing unit can be assigned to each capacitive sensor, so that the evaluation is synchronized as much as possible. The sigma/delta converter, however, can be used jointly by both sensors if a separate integration capacitor that can be added is provided for each sensor. A linking unit uses the resulting relative positions for determining the absolute position. However, it is also possible to have applications where a joint processing unit performs a serial evaluation of the measuring signals from both differential capacitors. To ensure a synchronous operation, the individual differential capacitors can be assigned buffer units, which are charged up with one or several charge pulses and synchronous if possible. The output voltages from these buffer units can be evaluated successively and slowly.

The distance measuring system according to the invention permits the detection of relatively large measuring distances with a high resolution and low interpolation errors. If necessary, the measuring range can be expanded nearly optionally. One simple option consists in reducing the width of a counter electrode row in sections and crosswise to the displacement direction. The width of the other counter electrode row can remain the same or can even be widened in sections. In any case, specific capacity ratios between the rows of transmitting electrodes and counter electrodes result in each section.

The switches, capacitors and operational amplifiers required for the evaluation can be realized with standard MOS technology, which is technically advantageous and cost-effective. The counter, comparative and other operations can be realized advantageously in a correspondingly programmed microcontroller or processor, even though a realization with circuit engineering is possible as well.

All past embodiments related in particular to a length measuring system. However, the distance measuring system is also suitable for the angle measuring. For that, the transmitting electrodes can be formed on the outside of a circular disk and the counter electrodes on the inside of a ring-shaped material measure, at a short distance to the disk and arranged such that they can rotate around their center axis.

BRIEF DESCRIPTION OF THE FIGURES

Further advantageous details of embodiments of the invention follow from the drawing as well as the associated description. The drawing shows an exemplary embodiment of the subject matter of the invention. Shown are in:

FIGS. 6*a* to 6*d* Different configurations of electrodes for the distance measuring system according to FIG. 1 and different triggering methods, shown in a schematic view from the top.

DETAILED DESCRIPTION OF THE INVENTION

Figure 1:
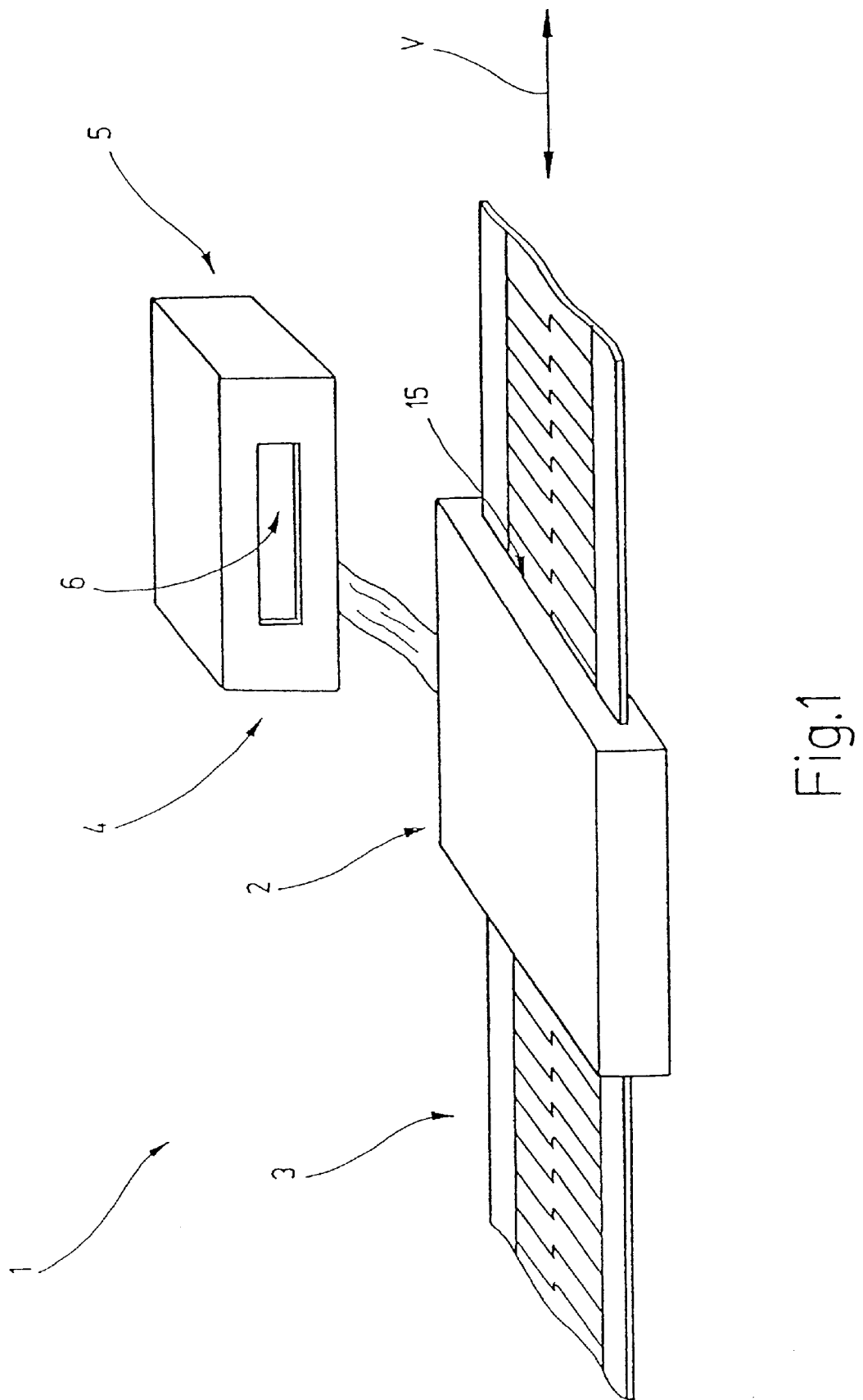
FIG. 1 A distance measuring system according to the invention, shown in a schematic, perspective representation.

FIG. 1 schematically shows a distance measuring system 1, which represents a part of a longitudinal measuring device and comprises a sensor head 2 and a material measure 3, for example a ruler. The material measure 3 for the present example extends through the sensor head 2 and is positioned so as to be displaceable in direction V, relative to the sensor head. For example, the distance measuring system 1 can be a sliding caliper. Sensors, which cannot be seen in FIG. 1, are arranged inside the sensor head 2 and are connected to a triggering unit 4 and a processing unit 5. These units 4, 5 can be provided on or in the sensor head 2 or, if necessary, in a separate display unit 6 for displaying the measured length. Elements for turning the measuring system 1 on or off or otherwise operating it are not shown in FIG. 1.

Figure 2:
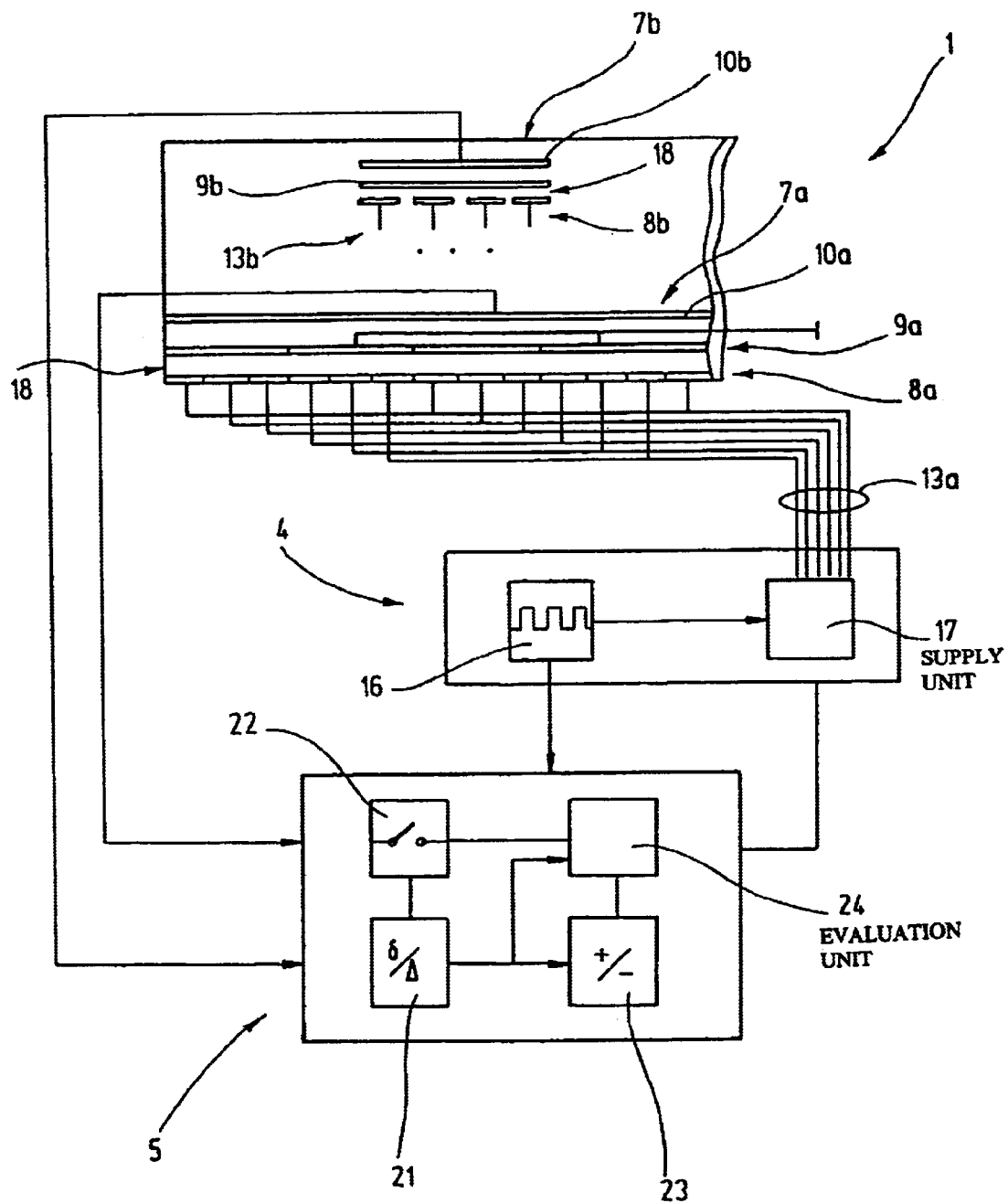
FIG. 2 A block diagram of the distance measuring system according to FIG. 1.

The basic design of the distance measuring system 1 follows in particular from FIG. 2. The distance measuring system 1 for the present example is an absolute distance measuring system, which determines the current position either directly or solely from the momentary measured values. For this, it has a first capacitive sensor 7*a* and a second capacitive sensor 7*b*, which is indicated in FIG. 2 with an equivalent circuit diagram. The sensors 7*a*, 7*b* are respectively formed by a row 8*a*, 8*b*, consisting of capacitances per unit length that function as transmitting electrodes, and associated rows 9*a*, 9*b* of counter electrodes, as well as by a receiving electrode 10*a*, 10*b*. If only a capacitive sensor 7*a* or 7*b* is provided, a relative measuring system is formed, which determines the position in increments.

Figure 4:
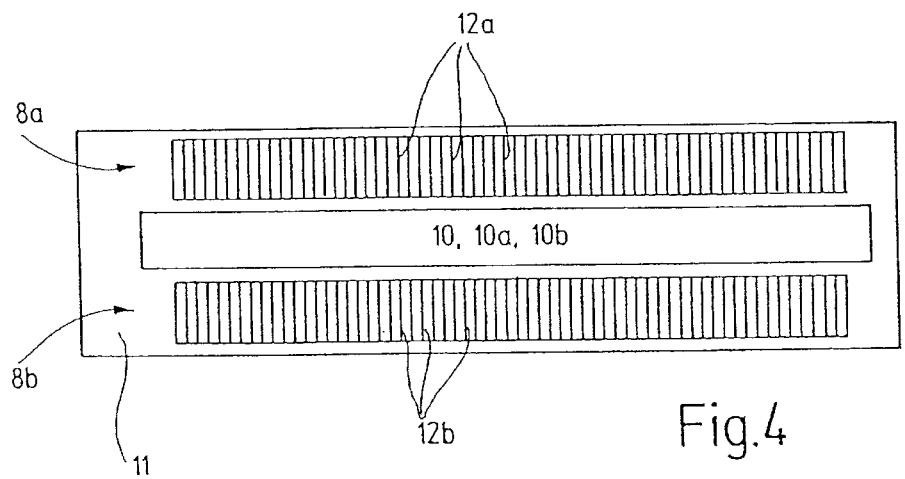
FIG. 4 A first arrangement of the transmitting electrodes for the distance measuring system according to FIG. 1, in a schematic view from the top.

The transmitting electrode rows 8*a*, 8*b* are preferably arranged on a joint surface 11 of the sensor head 2, parallel to each other in displacement direction V, as illustrated in FIG. 4. Each row 8*a*, 8*b* contains several, for example 2 to 16, rectangular transmitting electrodes 12*a*, 12*b*. The transmitting electrodes 12*a* are narrower in direction V than the transmitting electrodes 12*b*. Crosswise to this, their dimensions are preferably the same. The transmitting electrodes are connected via supply lines 13*a*, 13*a* to the triggering unit 4, from which they receive triggering signals.

The rows 9*a*, 9*b* with several counter electrodes 14*a*, 14*b* are arranged on the side of material measure 3, which is facing the surface 11 of sensor head 2. A gap or distance 15 is fixed between the transmitting electrodes 12*a*, 12*b* and the counter electrodes 14*a*, 14*b*, which is small as compared to width of those electrodes. The partition ratio for rows 9*a*, 9*b* corresponds to that of the transmitting electrode rows 8*a*, 8*b*. However, the width of counter electrodes 14*a*, 14*b* exceeds by a multiple the width of the transmitting electrodes 12*a*, 12*b*. In addition, the number of counter electrodes 14*a*, 14*b* that defines the maximum measuring length is considerably higher than the number of transmitting electrodes 12*a*, 12*b*.

The signals transmitted by the transmitting electrodes 12*a*, 12*b* to the counter electrodes 14*a*, 14*b* are returned via capacitive feedback to the receiving electrodes 10a, 10b. As a result, moving contacts can advantageously be avoided. The example shown in FIG. 4 provides for a single receiving electrode 10, which extends parallel between the transmitting electrode rows 8a, 8b and over their entire length. The counter electrodes 14a, 14b are respectively connected in pairs in crosswise direction or are formed by capacitances per unit length 14 in the form of two abutting rectangles that are somewhat offset relative to each other. The layout of the counter electrodes 14 can be seen in particular in FIG. 3.

The triggering unit 4 essentially comprises a clock generator 16 and a supply unit 17, which generates the triggering signals starting with the clocking pulses from the clock generator 16. The clocking rate preferably is in the range between 10 kHz and 300 kHz.

The triggering of the transmitting electrodes 12a, 12b is explained with the aid of FIGS. 6a to 6d. FIG. 6a schematically shows a pair of transmitting electrodes 12, designed to represent a transmitting electrode row 8a or 8b, and a representative counter electrode 14. The receiving electrode is not illustrated. By comparison, the counter electrode 14 is twice as wide as the transmitting electrodes 12. In the first position P1 shown in FIG. 6a, the counter electrode 14 overlays the left transmitting electrode 12 completely and, together with this electrode, forms a partial capacitor C1 of a differential capacitor 18. The overlay for the right transmitting electrode 12 in FIG. 6a is only about half, thus resulting in the forming of partial capacitor C2. The capacitance ratio C1/C2 is 2:1. During the movement of the counter electrode 14, the partial capacitance C2 is initially enlarged proportional to the distance moved until both transmitting electrodes 12a, 12b are completely overlaid. Another displacement results in a reduction of the partial capacitance C1 with the partial capacitance C2 remaining the same. In the second position P2, shown in FIG. 6a, the capacitance ratio C1/C2 is approximately 1:2. The supply unit 17 periodically triggers the transmitting electrode pair 12.

If several transmitting electrodes 12 are arranged in a row, as shown for example in FIG. 6b, and the counter electrode 14 is displaced further in the direction V, a changeover to the following pair of transmitting electrodes is advantageous because of the required measuring accuracy. In that case, the transmitting electrodes 12 in the center with references C1 and C2 are triggered. The designation "0" means that these transmitting electrodes receive either no signal or no alternating positive and negative charge packets so that the associated charges on the whole balance out. Each time the capacitance ratio C1/C2 moves from the range 2:1 to 1:2 because of a position change, a changeover to the following transmitting electrode pair occurs. It would also be possible to select a range between 0:1 and 1:0 and always change over to the second following electrode pair. However, the first example results in shorter changeover times and lower number of interpolation errors.

With a group of six transmitting electrodes 12, the counter electrode 14 can be as wide as three transmitting electrodes 12. The active electrode pair is formed by two transmitting electrodes with one intervening electrode arranged therebetween as shown in FIG. 6c on the top with the first triggering option. FIG. 6c on the bottom shows the last triggering option, for which the second transmitting electrode 12 in displacement direction V together with an element 14 of counter electrode row 9 forms the partial capacitor C2 and the last transmitting electrode 12 together with the next to the last element of the counter electrode row 9 forms the partial capacitor C1. The counter electrode 14 positioned in-between capacitors C1 and C2 and indicated with dash-dot line is not necessary for the measurement. In general, each second element of the counter electrode row 9a, 9b is therefore connected to ground or otherwise removed. A group of 6 transmitting electrodes permit a total measuring distance of six electrode widths, approximately 5 mm in practical operations.

Even larger groups and thus additional measuring distances can be formed in this way, wherein the number of non-triggered transmitting electrodes 12 that are positioned between the partial capacitors C1 and C2 is correspondingly increased. In addition, several such groups can be lined up in a row and transmitting electrodes with a specific ordinal number for all the groups can be triggered jointly, as shown for example in FIG. 6c on the bottom. All simultaneously triggered transmitting electrodes in that case define the respective partial capacitance C1 or C2 of the differential capacitor 18.

If 8 or more transmitting electrodes form a group, two or more side-by-side arranged transmitting electrodes 12 can also be combined and are triggered jointly (FIG. 6d). There are many options for arranging and activating the transmitting electrodes 12a, 12b.

As previously indicated, the desired capacitance ratio C1/C2 is determined with the aid of an interpolation method, for which the processing unit 5 is provided. The processing unit 5 includes a sigma/delta converter unit 21, a switch unit 22, a counter unit 23 as well as an evaluation logic or an evaluation unit 24.

Figure 7:
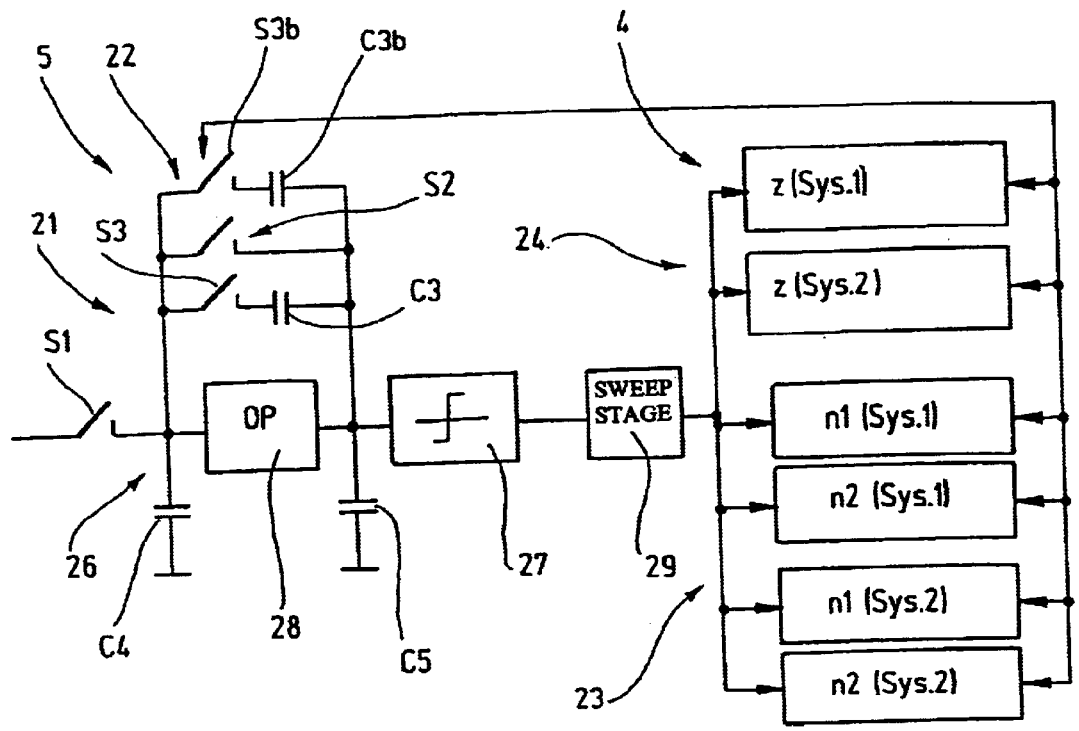
FIG. 7 A part of a processing unit in a sigma/delta converter, which can be used in a distance measuring system according to FIG. 1, shown as block wiring diagram.

The sigma/delta converter 21, illustrated in FIG. 7, is an analog circuit that essentially comprises an integrator 26, the input of which is connected via a switch S1 of switch unit 22 to the receiving electrode 10. It also comprises a comparator 27, which is connected to the output of integrator 26. This integrator is formed in the standard manner by an operational amplifier 28 and an integration capacitor C3, arranged in the feedback path of integrator 26. The input and the output of integrator 26 are respectively connected via capacitors C4, C5 to ground. These capacitors have only low capacitances as compared to the integration capacitor C3 and function to suppress interference in the charges caused by the switch unit 22.

The switch unit 22 comprises two additional switches S2 and S3. The switch S3 is arranged in the feedback line for integrator 26, in series with the integration capacitor C3. The switch S2 is connected parallel thereto and permits a short circuit between input and output of the integrator 26.

The output of comparator 27 is connected via a sweep stage 29, in particular a D flip-flop, to the counter unit 23 and, if necessary, to the evaluation unit 24. The counter unit 23 is provided with two counters for each capacitive sensor 7a, 7b, which count the number of current surges or charge packets n1, n2 that are transmitted and integrated via the individual partial capacitors C1, C2. The counter unit also contains a counter z that indicates the detected pair combination of transmitting electrodes 12a, 12b within the group. The counters n1, n2 determine the resolution, which can be selected to be almost infinitely large. In general, a resolution between 256 (8 bit) and 4096 (12 bit) is suitable for real-time use with low processing time and high accuracy.

Figure 8:
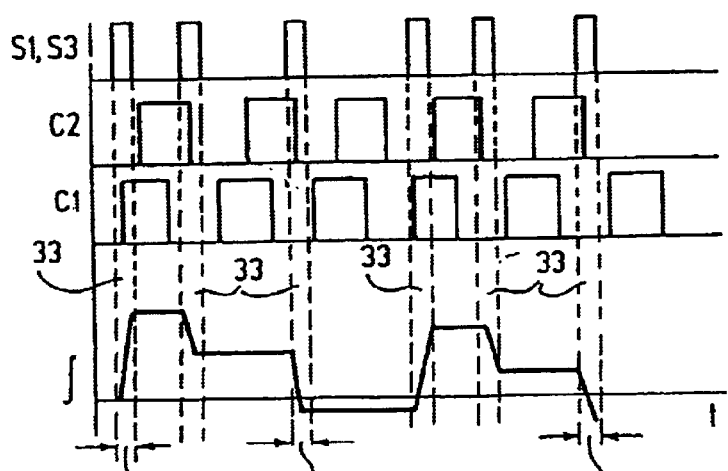
FIG. 8 Signals for triggering the transmitting electrodes of a differential capacitor and the output signal from the integrator of the sigma/delta converter according to FIG. 6, shown as schematic diagram.
Figure 13:
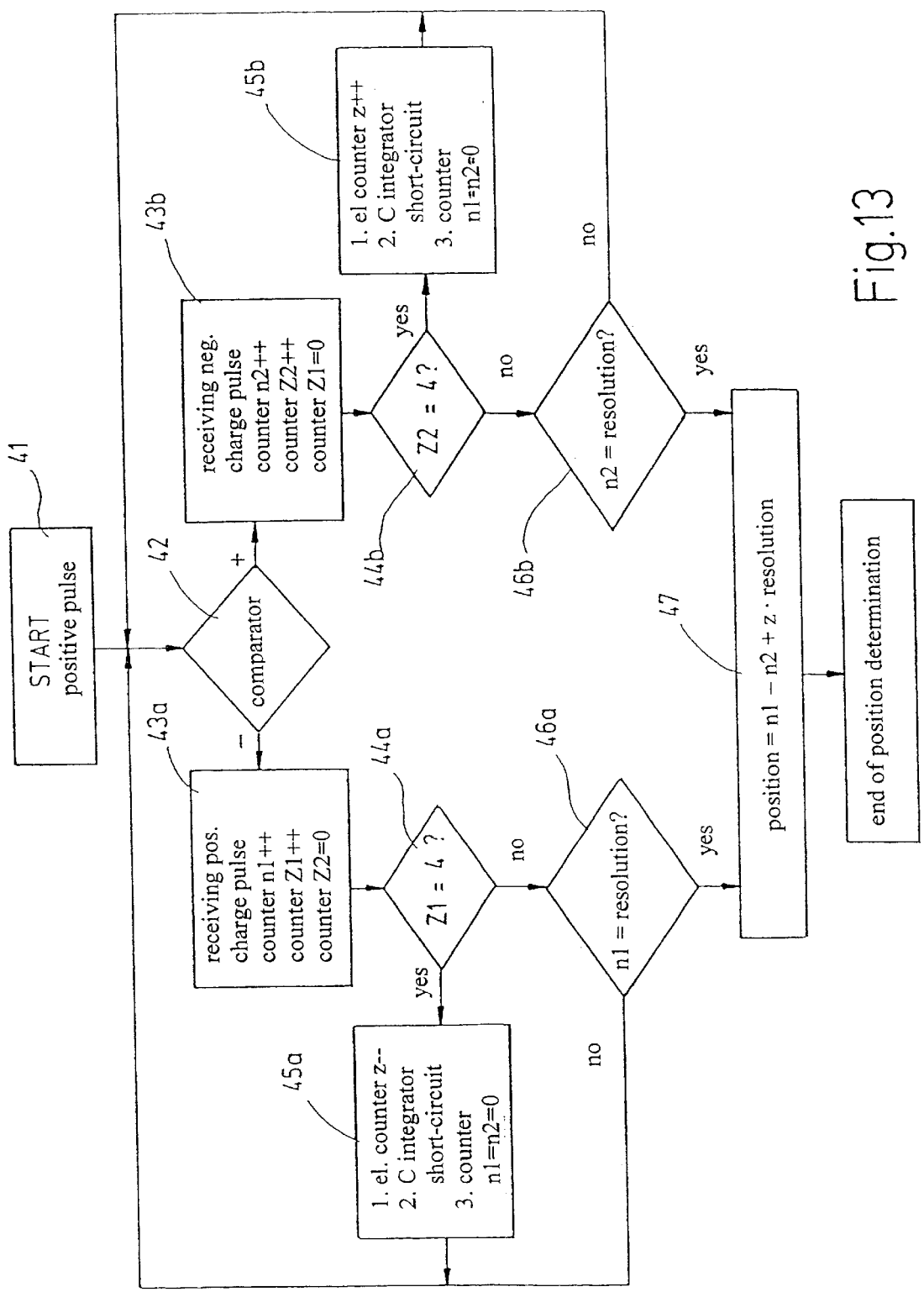
FIG. 13 A flow chart for the determination of the desired position.

The mode of operation of the distance measuring system described so far is described with the aid of FIG. 8, in connection with FIG. 13, which illustrates the program sequence for detecting the position. The distance measuring system functions as follows:

Insofar as a relative measuring system is used, this system must be moved to the starting position prior to the measuring operation to obtain defined starting conditions. The distance measuring system 1 is switched on and the counters n1, n2 and z are initialized. Following this, the material measure 3 can be moved to the position to be determined, relative to the sensor head 2. With the embodiment as absolute distance measuring system, the material measure 3 can be moved before the distance measuring system 1 is switched on and the counters n1, n2 and z are initialized.

Following this, a first pair of transmitting electrodes 12a are triggered in row 9a (block 41 in FIG. 13), which pair forms the corresponding partial capacitors C1, C2 of the differential capacitor 18. FIG. 8 in particular shows that the partial capacitors C1, C2 are triggered with periodic, positive rectangular pulses, wherein the triggering signals of the partial capacitor C2 (C2 signals) follow those from the partial capacitor C1 (C1 signals) with a phase offset of 90°. The triggering signals generate current surges or charge packets with different polarity on the receiving side, which essentially coincide with the edge changes and are allowed to pass to the integrator, where they are integrated once the switches S1 and S3 are closed. FIG. 8 shows that the switches S1 and S3 are closed, if possible, during the following cycle, for example during the rising edge of the C1 signal if the comparator output, meaning the total charge amount integrated in the integration capacitor C3, is negative or during the descending edge of the C2 signal if the total charge, meaning the comparator output, is positive (block 42 in FIG. 13). Thus, a corresponding positive or negative charge packet is received and added up (blocks 43a, b in FIG. 13).

The switches S1, S3 remain closed only for a predetermined duration T to define time windows 33 (FIG. 8) in which selected triggering signal edges are positioned. The phase offset, the time window 33 and its duration T are fixed, such that only one selected signal edge is positioned inside one time window 33 and that the time window 33 essentially covers only the edge change. The smaller the time window 33 and the better it is synchronized with the signal edges of the trigger signals, the more the influence of static interference and the non-linearity resulting from interference signals may be reduced. Higher frequency interference, for example electrostatic discharges introduced from the outside via the material measure 3, or charges that move in the dielectric of the scale cover owing to mechanical vibrations, can be suppressed effectively. Determining the time window 33 is therefore fundamentally important to the measuring accuracy or even for the functionality of the distance measuring system.

The number of evaluated C1 or C2 signals (blocks 43a, b in FIG. 13) is counted with the counters n1 and n2. Before the next signal is transmitted, the switches S1 and S2 can be closed and S3 can be opened. Since the integrator 26 input is connected to virtual ground, a charge current can be discharged and the partial capacitors C1 and C2 can be polarized with opposite polarization without this changing the charge of integration capacitor C3. This improves the linearity of the distance measuring system 1.

If the triggered transmitting electrode pair 12a is positioned outside of the preferred range of, for example, 1:2 to 2:1, the respective following pair is triggered. The necessity of changing the transmitting electrode pair is detected in that charge packets from the same partial capacitor C1 or C2 are integrated several times successively. FIG. 13 shows that additional counters Z1 and Z2 are used for this, which count the number of successively integrated charge packets (blocks 43a, b in FIG. 13). If one of the counters Z1 or Z2 reaches the value 4 (or 3), a change to the following electrode pair must take place (blocks 44a, b in FIG. 13). In that case, the counter z is incremented or decremented, the counters n1 and n2 are reset and the integration capacitor C3 is emptied (switches S2, S3 are closed); compare the blocks 45a, b in FIG. 13.

If one of the counters n1, n2 reaches a value specified by the desired resolution (blocks 46a, b in FIG. 13), the value of the other counter n1 or n2, which does not reach the end value, corresponds to the interpolation value within the electrode pair. The capacitance ratio C1/C2 in the reference system belonging to the sensor 7a is thus determined. With a relative measuring system, the exact position of the material measure 3 can be determined as follows from the counter readings n1, n2 and z (block 47 in FIG. 13):

position=$n1-n2+z \times$ resolution.

Figure 12:
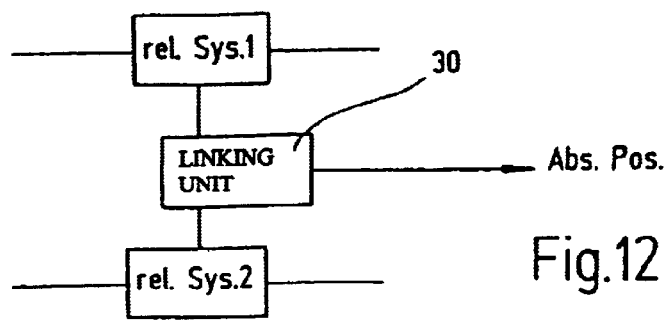
FIG. 12 A simplified block diagram illustrating the mode of operation of an absolute distance measuring system with two relative measuring systems.

Insofar as an absolute measuring system 1 and only a single processing device 5 are provided, the measuring cycle is subsequently repeated with the sensor 7b and the capacitance ratio C1/C2, meaning the counters n1, n2 and z, are determined for this as well. If the capacitance ratios C1/C2 for both measuring systems, meaning the associated counters n1, n2 and z, have been determined, a linking unit 30 determines the absolute position from this. FIG. 12 shows this in a simplified view. To determine the absolute position, the linking unit 30 can utilize, for example, the unambiguous connection between the difference of the capacitance ratios C1/C2 of both relative measuring systems and the displacement.

The transit time offsets that interfere with the serial processing of measuring values, particularly at high process speeds, can be avoided if a separate processing unit 5 is provided for each relative measuring system. In that case, the conversion can be almost synchronous. A single sigma/delta converter 21 is advantageously sufficient if the integrator 26 is provided with an additional integration capacitor C3b that can be added via a switch S3b, as shown in FIG. 7. During the measuring operation, the integration capacitors C3 or C3b switch back and forth constantly for the synchronous conversion. Prior to each integration, the switches S1 and S2 can be closed and the switches S3 and S3b can be opened to discharge a charge that may still exist in the lines, so that only the charge belonging to the same sensor 7a or 7b reaches the associated integration capacitor C3 or C3b.

Additional and advantageous modifications of the invention are illustrated in FIGS. 5 and 9 to 11. Insofar as the design and function coincide with the above-described distance measuring system, the same reference numbers are used and we refer to the above description.

Figure 9:
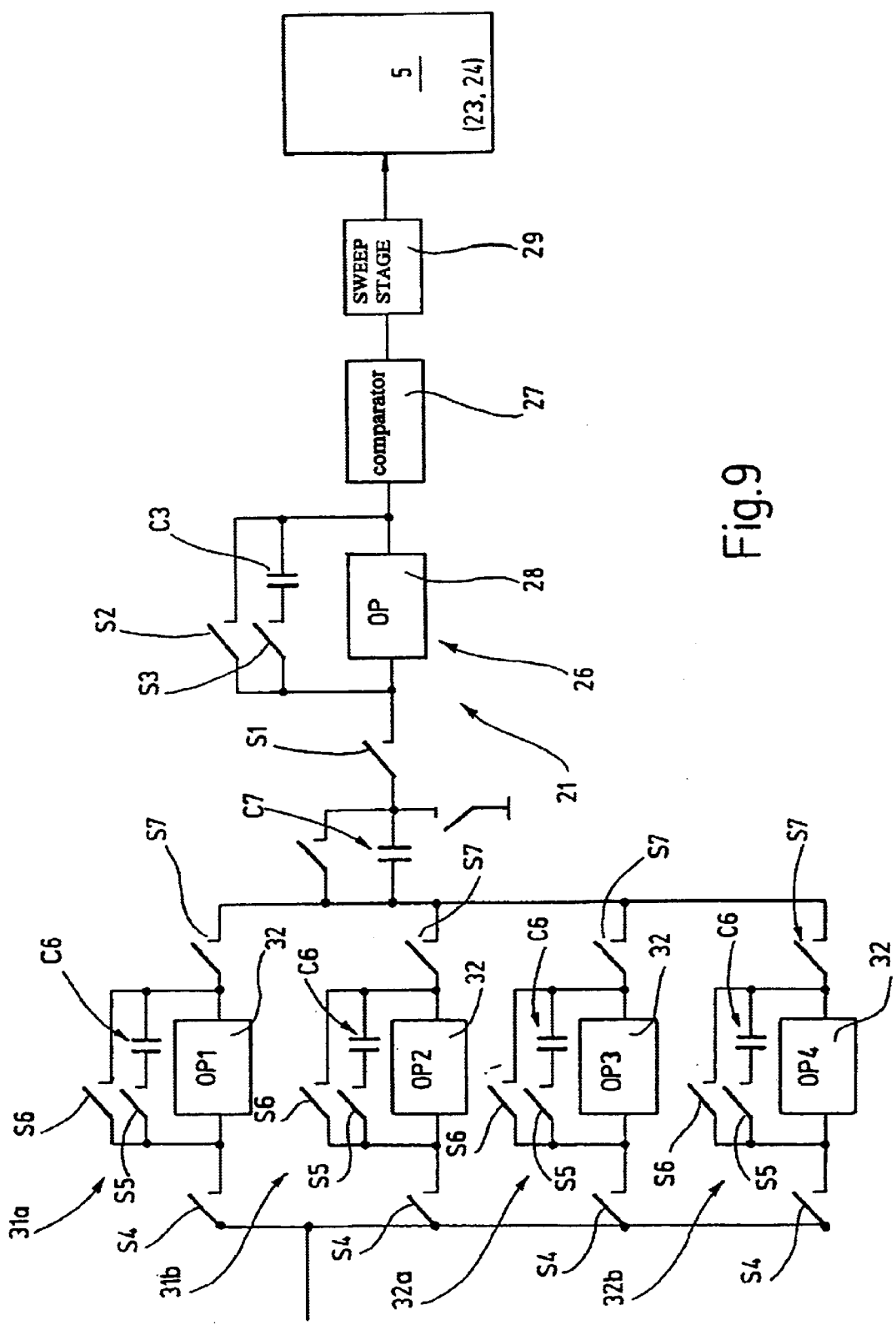
FIG. 9 A detail of a modified processing unit that can be used in the distance measuring system according to FIG. 1, shown as schematic wiring diagram.

FIG. 9 shows an embodiment of the processing unit 5, comprising a sigma/delta converter 21 and four charge buffers 31a, 32a, 31b, 32b connected in series. The charge buffers 31, 32a are assigned to the partial capacitors C1 or C2 of the first sensor 7a and the charge buffers 31b, 32b are assigned to the second sensor 7b. The charge buffers 31a, 32a, 31b, 32b have identical designs and are traditional Sample-and-Hold elements with respectively one operational amplifier 32 and one associated charge capacitor C6. The charge capacitors C6 are charged, if possible synchronously, with 1 to 4 or even up to approximately 16 charge pulses from the associated partial capacitor C1 or C2. The switches S4 and S5 used for this are essentially closed from shortly before until shortly after the corresponding signal edge to prevent interference signals from being integrated during the complete pulse duration. Additional switches S6 serve to discharge the capacitors C6 as well as to polarize the partial capacitors C1 and C2 prior to receiving a charge pulse. A connection to the evaluation unit 24 can be established via a switch S7 at the output of each charge buffer 31a, 32a, 31b, 32b and a joint coupling capacitor C7. If the charge buffers 31a, 32a, 31b, 32b are charged, their output voltage is proportional to the variable for the respective partial capacitor C1 or C2 of an associated sensor. These voltages consequently can be evaluated later on and slowly. A good, synchronous position detection with only one processing unit 5 is advantageously possible in this way.

Figure 10:
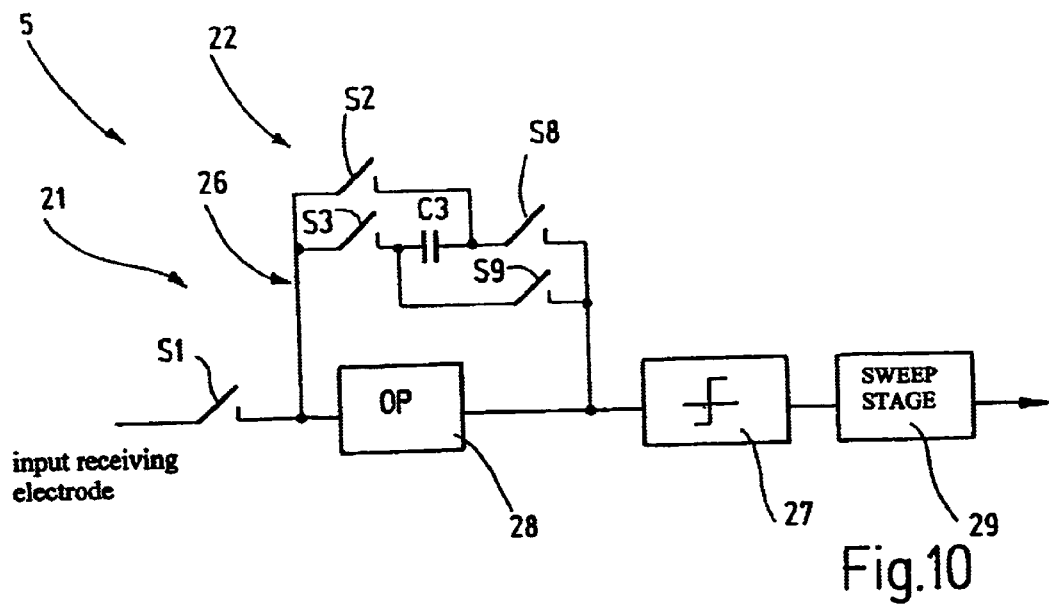
FIG. 10 A section of another embodiment of a processing unit shown as schematic wiring diagram.

In order to increase the signal-to-noise ratio, the transmitting and measuring signals can be inverted periodically, for example during each second cycle. As a result, the energy from low-frequency interference, for example stemming from the activation of the display unit 6 or caused by mechanical vibration of electrical charges in the dielectric for the scale covering, are for the most part canceled in the integrator 26. An inversion of the triggering signals can be realized with the supply unit 17, for example by using an exclusive OR gate. An edge change can also be realized during the evaluation after each second clock cycle. An integrator circuit suitable for demodulation is shown in FIG. 10. In this circuit, an additional switch S8 is connected to the connection point for switch S2 and the integration capacitor C3 and an additional switch S9 at the connecting point for switch S3 and the integration capacitor C3. These additional switches are respectively connected to the output of integrator 26. The integration capacitor C3 is charged up as before, with the switches S3 and S8 closed. With inverted transmitting and measuring signals, on the other hand, the switches S2 and S9 are closed to reverse the integration capacitor C3, meaning for a reversed charging up. The amount of the integrated total charge is thus always changed correctly. Of course, the comparator output must also be inverted periodically for this measure.

Figure 3:
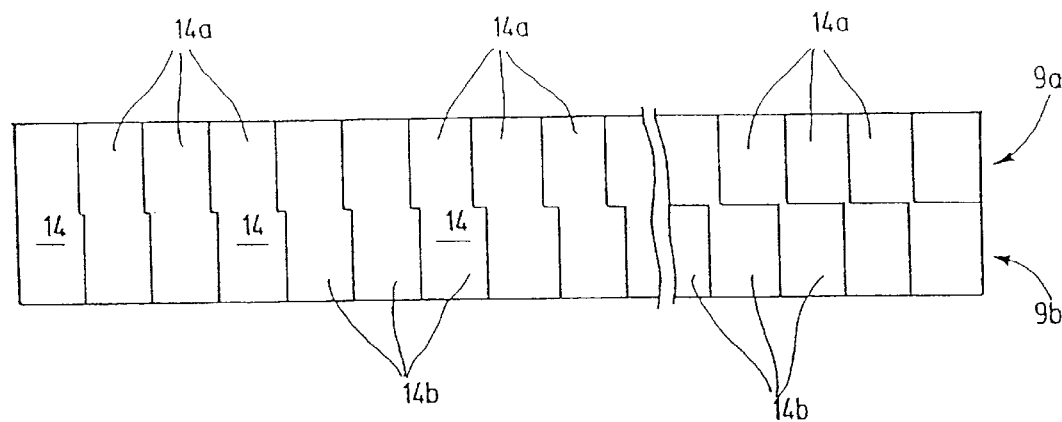
FIG. 3 A material measure for the distance measuring system according to FIG. 1, in a schematic view from the top and using a different scale.
Figure 5:
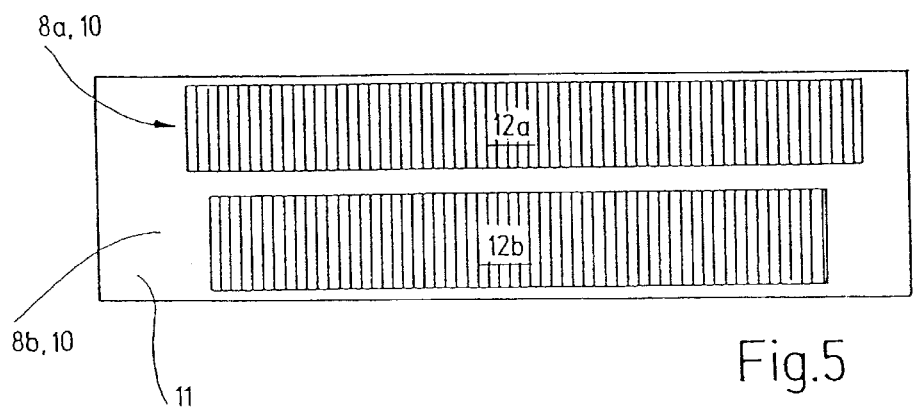
FIG. 5 A different arrangement of the transmitting electrodes in a schematic view from the top.

FIG. 5 shows one advantageous embodiment of the capacitive sensor 7a, 7b, wherein the layout of counter electrodes 14a, 14b can be identical to the one shown in FIG. 3. FIG. 5 also shows that a receiving electrode 10 can be omitted if the transmitting electrodes 12a and 12b can be switched between transmitting and receiving operation. The electrodes 12a are used as receiving electrodes if the transmitting electrodes 12b are in the transmitting mode and vice versa. In this way, the largest possible electrode surfaces can be created on a given surface of the sensor head 2 for two parallel relative measuring systems, which results in a good ratio between useful signals and interference signals, as well as a low number of interpolation errors. The requirements with respect to internal noise in the evaluation electronics and the susceptibility to interfering outside signals are thus reduced.

If the transmitting electrode rows 8a, 8b consist of 1 to several groups of transmitting electrodes, for example 6, with a measuring distance of approximately 5 mm (compare FIG. 6c) and the cycle lengths of the material measure 3 differ by 1/64, the maximum measuring distance is approximately 320 mm. With a variant of the material measure 3, shown in FIG. 11, the two parallel relative measuring systems described so far can be expanded by another measuring system and the measuring width can be increased almost optionally.

Figure 11:
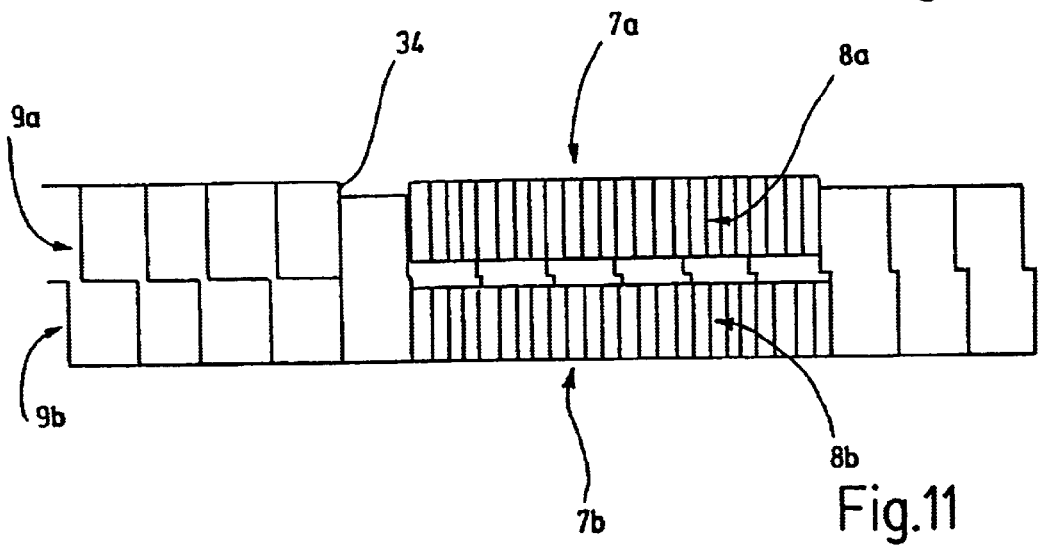
FIG. 11 A third measuring system for extending the measuring distance, shown as a schematic view from the top to illustrate the principle.

As shown in principle in FIG. 11, the width of the one row 9a with counter electrodes 14a is reduced in sections, crosswise to the displacement direction V. The width of the other row 9b remains unchanged. In the position according to FIG. 11, the transmitting electrodes 12a are overlaid only partially by the counter electrodes 14a. In the section to the left of stage 34, which is visible in FIG. 11, the transmitting electrodes 12a are overlaid completely. Several such sections can be provided. In two to four sections, the measuring range is expanded to 500 mm or 1 m. The partitions are preferably stored in the processing unit 5 prior to the initial start-up. In the same way, the capacitance values C1, C2 or their ratio C1/C2 are stored, which are obtained during a complete overlay, for example in the first section, if all transmitting electrodes 12a or 12b are triggered in parallel.

During a measurement, the position described in the above is initially determined. Subsequently, all transmitting electrodes 12a or 12bare triggered sequentially and the respective partial capacitances or their ratios are determined, wherein a lower resolution is sufficient for this, for example between 4 bit (16) and 8 bit (256). By comparing the determined values to the stored values, the active section and from this the absolute position is determined. Alternatively, it is possible to use for the third measuring operation only the transmitting electrodes used for the preceding position measuring with the first two measuring systems, which are overlaid over the total width in displacement direction.

A distance measuring systems 1 comprises a capacitive sensor 7a, 7b designed as differential capacitor 18, the partial capacitors C1, C2 of which have capacitances that depend on the position to be determined. The system also comprises a processing device 5, for example with a sigma/delta demodulator, for determining the searched for distance. The partial capacitors C1, C2 are periodically triggered with binary signals, wherein the trigger signals of the one partial capacitor C1 are transmitted phase-offset to those of the other partial capacitor C2. The processing device 5 determines which trigger signals must be used for the evaluation. In time windows synchronized with the trigger signal edges, a switch unit 22 allows the associated receiving signals to pass through to the processing device 5 and blanks out all other signals. The distance measuring system 1 makes it possible to have few interpolation errors with high resolution and long interpolation periods.

The distance measuring system 1 can be expanded with two essentially independent, parallel operating relative measuring systems to form an absolute distance measuring system, which determines the absolute position solely from the current measuring values. Adding another relative measuring system to the distance measuring system 1 will expand the measuring range.

What is claimed is:

1. A capacitive distance measuring system, comprising:
   at least one capacitive sensor configured as differential capacitor, which includes at least two transmitting electrodes and one or more counter electrodes, arranged opposite and at a distance to the respective transmitting electrodes, such that they can be displaced relative to the transmitting electrodes and that at least two partial capacitors are formed, wherein the capacitance of at least one partial capacitor changes in proportion to the distance,
   a trigger unit adapted to feed binary trigger signals with rising and descending edges at predetermined moments to selected transmitting electrodes that form partial capacitors of the differential capacitor for generating measuring signals, wherein the trigger signals for the two partial capacitors have a fixedly determined phase offset relative to each other,
   a processing device that evaluates the measuring signals for determining the partial capacitances of the differential capacitor and from the distance to be measured and that selects specific edges of the triggering signals to be used for generating measuring signals to be evaluated, and a switch unit for defining time windows in which the selected edges of the trigger signals are positioned, so that the associated measuring signals can pass through and be evaluated in the processing unit.

2. A distance measuring system according to claim 1, wherein the trigger signals are substantially rectangular signals and that the phase offset between the trigger signals is adapted, so that only one selected signal edge can be observed within a time window.

3. A distance measuring system according to claim 1, wherein the phase offset essentially is 90°.

4. A distance measuring system according to claim 1, wherein the trigger signals from the one partial capacitor have the same curve shape and the same polarity as the trigger signals from the other partial capacitor.

5. A distance measuring system according to claim 1, wherein the processing device further comprises a sigma/delta converter, which includes an integrator that integrates the charge transmitted via the differential capacitor; and a comparator that issues the mathematical sign for the complete integrated charge.

6. A distance measuring system according to claim 5, wherein the switch unit permits a measuring signal from one of the partial capacitors of the differential capacitor to pass through in dependence on the comparator output.

7. A distance measuring system according to claim 5, wherein the time window is dimensioned sufficiently large so as to nearly completely integrate the received charge packets in an integration capacitor of the integrator, taking into consideration the internal resistance of the source feeding the integration capacitor.

8. A distance measuring system according to claim 7, wherein the time window is selected larger than the sum of the rise time and ten times the time constant ($\tau$), which is defined as the product of the internal resistance of the voltage source used and the maximum partial capacitance.

9. A distance measuring system according to claim 1, wherein the time window is smaller than the pulse duration of a trigger signal.

10. A distance measuring system according to claim 1, wherein the switch unit creates defined voltage ratios at the partial capacitances before each trigger signal is transmitted.

11. A distance measuring system according to claim 1, wherein the switch unit further comprises switches for eliminating low-frequency interference.

12. A distance measuring system according to claim 11, wherein a periodic edge change must occur during the evaluation in order to eliminate interference.

13. A distance measuring system according to claim 1, further comprising several transmitting electrodes arranged in at least one row.

14. A distance measuring system according to claim 13, wherein the width of the counter electrodes, as measured in one displacement direction (V), corresponds to a whole number multiple of the width of the transmitting electrodes and that a row that is preferably formed with several counter electrodes in displacement direction (V) measures a multiple of the length of the transmitting electrode row.

15. A distance measuring system according to claim 1, wherein each second counter electrode is connected to ground or has been removed.

16. A distance measuring system according to claim 1, wherein a non-contacting pick-up of the measuring signals occurs.

17. A distance measuring system according to claim 1, wherein several individual pulses are transmitted to each partial capacitor for the measuring and that the resulting charge packets are added up, wherein the partial capacitances are determined through interpolation.

18. A distance measuring system according to claim 17, wherein the processing unit comprises a counter unit with two counters for adding up the number of integrated charge packets that are transmitted via the respective partial capacitors.

19. A distance measuring system according to claim 18, wherein starting with the counter readings, the trigger unit determines the pair of transmitting electrodes that must be triggered, so that the ratio of partial capacitances relative to each other is within a predetermined range, preferably in the range of 1:2 to 2:1.

20. A distance measuring system according to claim 1, wherein the transmitting electrodes are combined into groups containing a number of electrodes which offer a corresponding number of trigger options.

21. A distance measuring system according to claim 1, comprising at least two capacitive sensors that are configured as differential capacitors and which include transmitting electrode rows, each having a constant partition that differs for the rows, and an associated counter electrode rows, wherein the processing device determines an absolute value for the absolute distance to be measured from the ratios of the partial capacitances of the individual differential capacitors.

22. A distance measuring system according to claim 21, wherein the transmitting electrode rows extend in a joint plane and parallel to each other and that the counter electrodes are arranged on a joint surface of a material measure that is facing the transmitting electrodes.

23. A distance measuring system according to claim 21, wherein only one receiving electrode is provided, which is arranged parallel in between the transmitting electrode rows and that individual elements of the counter electrodes are connected.

24. A distance measuring system according to claim 21, wherein alternate rows of the transmitting electrodes are connected as receiving electrodes.

25. A distance measuring system according to claim 21, wherein a separate processing unit is assigned to each differential capacitor for determining the respective relative positions and further comprising a linking unit for determining the absolute position from the two relative positions.

26. A distance measuring system according to claim 21, wherein a joint converter unit is assigned to the two differential capacitors, wherein the two systems have a separate integration capacitor that can be added.

27. A distance measuring system according to claim 21, further comprising charge buffers for the differential capacitors which are charged with one or more charge pulses.

28. A distance measuring system according to claim 21, further comprising an additional measuring system for expanding the measuring range.

29. A distance measuring system according to claim 28, wherein the width of one row of counter electrodes is reduced in sections, crosswise to a displacement direction (V), while the width of the other counter electrode row remains the same or is increased in sections, so that specific capacitance ratios exist in each section between the transmitting electrode rows and the counter electrode rows.

30. A distance measuring system, comprising:

at least two capacitive sensor configured as differential capacitors, which include transmitting electrode rows each having a constant partition that differs for the rows, and an associated counter electrode rows, arranged opposite and at a distance to the respective transmitting electrodes, such that they can be displaced relative to the transmitting electrodes and that at least two partial capacitors are formed, wherein the capacitance of at least one partial capacitor changes in proportion to the distance, a trigger unit adapted to feed binary trigger signals with rising and descending edges at predetermined moments to selected transmitting electrodes that form partial capacitors of the differential capacitor for generating measuring signals, wherein the trigger signals for the two partial capacitors have a fixedly determined phase offset relative to each other, a processing device that evaluates the measuring signals for determining the partial capacitances of the differential capacitor and from this the distance to be measured and that selects specific edges of the triggering signals to be used for generating measuring signals to be evaluated, and a switch unit for defining time windows in which the selected edges of the trigger signals are positioned, so that the associated measuring signals can pass through and be evaluated in the processing unit.

31. A distance measuring system according to claim 30, wherein the transmitting electrode rows extend in a joint plane and parallel to each other and that the counter electrodes are arranged on a joint surface of a material measure that is facing the transmitting electrodes.

32. A distance measuring system according to claim 30, wherein only one receiving electrode is provided, which is arranged parallel in between the transmitting electrode rows and that individual elements of the counter electrodes are connected.

33. A distance measuring system according to claim 30, wherein alternate rows of the transmitting electrodes are connected as receiving electrodes.

34. A distance measuring system according to claim 30, wherein a separate processing unit is assigned to each differential capacitor for determining the respective relative positions and further comprising a linking unit for determining the absolute position from the two relative positions.

35. A distance measuring system according to claim 30, wherein a joint converter unit is assigned to the two differential capacitors, wherein the two systems have a separate integration capacitor that can be added.

36. A distance measuring system according to claim 30, further comprising charge buffers for the differential capacitors that are charged with one or more charge pulses.

37. A distance measuring system according to claim 30, further comprising an additional measuring system for expanding the measuring range.

38. A distance measuring system according to claim 37, wherein the width of one row of counter electrodes is reduced in sections, crosswise to a displacement direction (V), while the width of the other counter electrode row remains the same or is increased in sections, so that specific capacitance ratios exist in each section between the transmitting electrode rows and the counter electrode rows.

* * * * *